United States Patent [19]
Fethe

[11] Patent Number: 5,926,794
[45] Date of Patent: Jul. 20, 1999

[54] VISUAL RATING SYSTEM AND METHOD

[75] Inventor: Harold E. Fethe, Los Altos Hills, Calif.

[73] Assignee: ALZA Corporation, Palo Alto, Calif.

[21] Appl. No.: 08/611,736

[22] Filed: Mar. 6, 1996

[51] Int. Cl.$^6$ .................................................. G06F 17/60
[52] U.S. Cl. ............................................. 705/11; 395/211
[58] Field of Search ............................. 705/11; 395/211,
395/209; 434/107, 219, 236, 307 R, 322,
350, 218, 362; 364/551.01, 552, 401; 128/920,
922, 923, 924, 782; 358/93

[56] References Cited

U.S. PATENT DOCUMENTS

| | | | |
|---|---|---|---|
| 4,413,277 | 11/1983 | Murray | 358/93 |
| 4,671,772 | 6/1987 | Slade et al. | 434/219 |
| 4,719,587 | 1/1988 | Berte | 364/552 |
| 4,863,384 | 9/1989 | Slade | 434/107 |
| 5,306,154 | 4/1994 | Ujita et al. | 434/218 |
| 5,326,270 | 7/1994 | Ostby et al. | 434/362 |
| 5,375,610 | 12/1994 | LaCourse et al. | 128/782 |
| 5,500,795 | 3/1996 | Powers et al. | 364/401 |
| 5,551,880 | 9/1996 | Bonnstetter et al. | 434/236 |
| 5,655,086 | 8/1997 | Jury et al. | 395/209 |

OTHER PUBLICATIONS

Mark R. Edwards, Ph.D. and Ann J. Ewen, Ph.D., "Automating 360 Degree Feedback," *HRFOCUS*, Mar. 1996, p. 3.
"Oil Company Sample Survey, 360° Feedback," TEAMS, Inc., 1994.
"Pear 360°, Processing Your Employee Evaluations," HR Soft, pp. 1–2.
"Performance Now!," promotional material, pp. 1–2.
"The Complete Appraisal Management System™," Avantos AMS/3™ for Windows®, pp. 1–2.

*Primary Examiner*—Kevin J. Teska
*Assistant Examiner*—Russell W. Frejd
*Attorney, Agent, or Firm*—Blank Rome Comisky & McCauley LLP

[57] ABSTRACT

An improved performance appraisal system is disclosed which utilizes a visual scoring model which, utilizing visual simplicity, enables raters to capture complex, comparative, hierarchial performance information which is difficult to communicate in numbers or words.

22 Claims, 6 Drawing Sheets

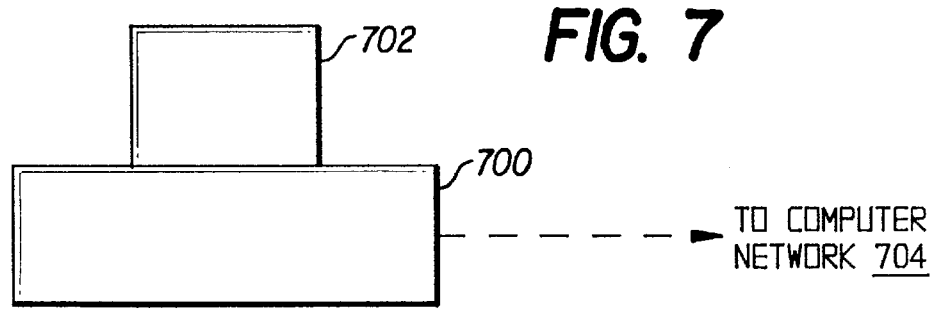

Manager: Lisa Smith  RATING RESULTS  Rating Session: DEMO
Location: CA  RESEARCH & DEVELOPMENT - AREA 7500  Printed 02/03/96 at 8:26pm Responsibility Group 1

| | #R | RP | Acc | Results Score | %ile | Decisions Score | %ile | Self- Score | %ile | Problem- Score | %ile | Interaction Score | %ile |
|---|---|---|---|---|---|---|---|---|---|---|---|---|---|
| 7527 Brown Adan | 3/4 | 7 | 45 | 11.5 | 15 | 12.5 | 80 | 10.0 | 25 | 12.0 | 55 | 13.5 | 45 |
| 7528 White Henry | 3/4 | 6 | 40 | 23.5 | 70 | 23.5 | 25 | 23.5 | 70 | 23.0 | 25 | 23.5 | 70 |

Responsibility Group 2

| | #R | RP | Acc | Results Score | %ile | Decisions Score | %ile | Self- Score | %ile | Problem- Score | %ile | Interaction Score | %ile |
|---|---|---|---|---|---|---|---|---|---|---|---|---|---|
| 7525 Burns Mike | 5/6 | 23 | 70 | 16.0 | 35 | 19.5 | 35 | 19.0 | 55 | 14.5 | 35 | 19.5 | 50 |
| 7523 Jones Cindy | 8/8 | 26 | 95 | 7.0 | 10 | 7.5 | 10 | 6.5 | 5 | 7.0 | 10 | 10.5 | 20 |

Responsibility Group 3

| | #R | RP | Acc | Results Score | %ile | Decisions Score | %ile | Self- Score | %ile | Problem- Score | %ile | Interaction Score | %ile |
|---|---|---|---|---|---|---|---|---|---|---|---|---|---|
| 7526 Green Jennifer | 10/10 | 44 | 85 | 24.0 | 85 | 23.5 | 80 | 24.0 | 85 | 23.5 | 75 | 23.0 | 85 |
| 7521 Smith Bob | 6/8 | 22 | 80 | 24.0 | 80 | 24.0 | 80 | 22.5 | 70 | 23.0 | 65 | 22.0 | 55 |
| 7524 Watson Rachel | 11/11 | 73 | 95 | 23.0 | 85 | 22.0 | 75 | 23.0 | 90 | 22.0 | 80 | 22.0 | 80 |
| 7522 Wilson Fred | 12/12 | 92 | 75 | 16.5 | 40 | 16.5 | 60 | 17.0 | 60 | 14.5 | 55 | 16.5 | 40 |

Supervisors

| | #R | RP | Acc | Results Score | %ile | Decisions Score | %ile | Self- Score | %ile |
|---|---|---|---|---|---|---|---|---|---|
| 7525 Burns Mike | 5/6 | 22 | 70 | 16.5 | 15 | 19.0 | 35 | 16.0 | 45 |
| 7521 Smith Bob | 6/8 | 22 | 80 | 22.0 | 45 | 22.5 | 75 | 23.0 | 55 |
| 7524 Watson Rachel | 11/11 | 82 | 95 | 22.0 | 85 | 22.0 | 75 | 22.0 | 75 |
| 7522 Wilson Fred | 12/12 | 97 | 75 | 16.0 | 50 | 13.5 | 20 | 15.5 | 35 |

FIG. 6

VISUAL RATING SYSTEM AND METHOD

BACKGROUND OF THE INVENTION

The present invention relates to an improved performance appraisal system. More particularly, the present invention relates to a unique visual interface and a system for converting information acquired by that interface to a performance ranking for use in producing a performance appraisal for one or more employees.

The so called 360° performance appraisals are used to gather performance information concerning each employee being rated from coworkers, direct reports and from supervisors. Thus, 360° performance appraisals provide benefits over other types of performance appraisal systems by placing an increased emphasis on teamwork and by providing internal customers with a voice in the performance appraisal of employees who service them. In addition, the so called 360° performance appraisal serves to balance the personal biases of any single appraiser. The 360° performance appraisals are becoming more popular as corporate organizations are getting flatter. Some implications of such flattened organizational structure are that managers are no longer just the subject matter experts or authority figures that they once were. Rather, managers are now also helpers and information brokers.

The implications of such changing roles of managers dictate a change in the methodology for conducting performance appraisals. For example, job specifications are continually changing, thus not allowing enough time for employers to write elaborate performance criteria, then measure and then communicate performance appraisals effectively. Instead, performance appraisals are now conducted using employees who work together since those employees have the necessary information, that is, the direct observations of the performance of the employee being appraised. In addition, the evolving business management structure has resulted in managers who often supervise people whose expertise in their areas of responsibility is superior to that of the supervisor. It is difficult for supervisors to evaluate employees who have greater expertise in those areas than they do. Therefore, it is useful to utilize a fellow expert employee as a rater so that the supervisor can more easily assess the employee's work using another employee who knows the subject area.

Finally as with all performance appraisals, since supervisors are human, they are susceptible to harshness or favoritism. The use of multiple raters can balance supervisors' points of view and provide a more realistic appraisal of the employee being rated.

One of the difficulties of the use of the so called 360° performance appraisal is that prior to the present invention, that type of performance appraisal usually entails a complex and time consuming process which requires gathering enough relevant information about each performer from enough people within a company. It also requires the translation of the responses about each performer or employee into coherent individual performance evaluations. It is also important, and frequently difficult with 360° performance appraisals, to present the performance results to supervisors in an effective, coherent and useful manner.

In the past, the use of 360° performance appraisals utilizing multi-raters was also very costly. For example, the performance appraisal process required a great many writings or meetings to gather performance evaluation from all raters or evaluators. It is often necessary to create, distribute and recover documents from 3 to 10 raters for each employee being evaluated.

Yet another difficulty with implementing 360° performance appraisal systems is that the use of multi-rater appraisals can result in inconsistent results. Such inconsistent results can be caused by, among other things, the fact that each supervisor approaches the multi-rater process in a different manner.

In light of the shortcomings of prior art 360° as well as other performance appraisal systems, the present invention provides for the simplified entry processing of evaluations. The present invention is designed to provide a confidential way for raters to voice their opinions, thereby increasing the accuracy of the data collected. The present invention provides for an easy to use interface for gathering and processing the data necessary to provide an accurate performance appraisal of the employee being rated. Effects from common scoring problems such as central tendency, leniency and shallow, noisy or inconsistent data are eliminated by the present invention.

The present invention also provides useable and meaningful results of the performance appraisal to multiple individuals. Each of the employees being rated is provided with a clear picture of how raters view their performance. Supervisors are provided with an appraisal which has an intuitive and easily understandable relationship to the collected evaluation input data.

In order to accomplish the foregoing objectives, the present invention is structured as a network-based, multi-rater, performance appraisal system. It utilizes an intuitive visual rater interface which simplifies the task of evaluating the performance of multiple employees. The performance appraisal system of the present invention helps to identify core competencies of employees and helps link performance in those competencies to company objectives. The performance appraisal system of the present invention functions to present information in a detailed, yet easily understood, format that maintains the visual paradigm established by the visual rater interface.

SUMMARY AND OBJECTS OF THE INVENTION

In view of the foregoing shortcomings of prior art performance appraisal systems, it should be apparent that there still exists a need in the art for a performance appraisal system which removes the confusing aspects of rater performance by using a visual image that allows natural use by raters when making comparisons. Visual images are then captured and turned into useful data for both supervisors and employees. The data is managed in order to address multiple needs in the performance arena, namely, coaching, management of rewards and knowledge-workers' expectations to understand how the performance rating system works. Reports prepared using the information captured by means of the visual image interface are designed to accommodate both visually oriented and numerically oriented users.

It is, therefore, an object of the present invention to provide an improved performance appraisal system which utilizes a visual rater interface that accurately captures the desired information from which to prepare reports regarding the appraisal of each employee being rated.

It is also an object of the present invention to provide an improved performance appraisal system which provides full data conversion of the information gathered through the visual rater interface into full data for both the employee and supervisor.

It is another object of the present invention to provide a performance appraisal system which manages the captured data, provides an assessment of data quality and an indication of raters' tendencies towards leniency and harshness.

These and other objects are accomplished by the improved performance appraisal system of the present invention by utilizing a visual scoring model, which, utilizing visual simplicity, enables raters to capture complex, comparative, hierarchical performance information which is difficult to communicate in words or numbers. The visual scoring interface utilizes a natural image for comparing things and is based upon the system of "higher is better; lots higher is lots better." Thus, the best employees are placed at the top of the scoring screen while the "good" employees are placed lower on the same screen. Using such an interface, the performance appraisal system of the present invention allows raters to represent on a computer monitor or other screen, their mental image of the employees' performance. Raters are not forced to reduce a complex decision to a number from 1 to 10. Raters are able to view all ratees simultaneously on the same screen. Thus, raters are able to consider all available information in making their assessments. Simultaneous evaluation also ensures consistency among the evaluations of different employees, because decisions are always made in context and the reviewer can see the entire picture at once before proceeding to a final opinion.

Thus, the performance appraisal system of the present invention, and particularly the visual rater interface used with that system, provides an easy way for raters to express what they have observed, while at the same time requiring raters to compare the performance of each of the ratees, without calling undue attention to the comparison, nor creating the necessity for the raters to say or write negative comments concerning a colleague.

Once the multi-rater performance data has been gathered using the visual rater interface, the inputs are translated into reliable useful feedback by producing composite reports for each participant. The reports show the ratees how well they met the needs of their customers overall and in which specific areas their strengths and weaknesses lie. The performance appraisal system of the present invention thus provides reports which are consistent and credible. The visual rater interface which employees see as raters has the same look and scale that their printed performance profiles have. The closed-visual design removes the confusion inherent in many performance appraisal processes, which gather information in one manner and represent it in another.

With these and other objects, advantages and features of the invention that may become hereinafter apparent, the nature of the invention may be more clearly understood by reference to the following detailed description of the invention, the appended claims and to the several drawings attached herein.

BRIEF DESCRIPTION OF THE DRAWINGS

FIG. 1 is a drawing of the visual rater interface used in connection with the performance appraisal system of the present invention;

FIG. 6 is a drawing of a group rater report produced by the performance appraisal system of the present invention; and FIG. 7 is a drawing of a personal computer or terminal which may be used in connection with the performance appraisal system of the present invention.

DETAILED DESCRIPTION OF THE PREFERRED EMBODIMENT

Figure 2A:
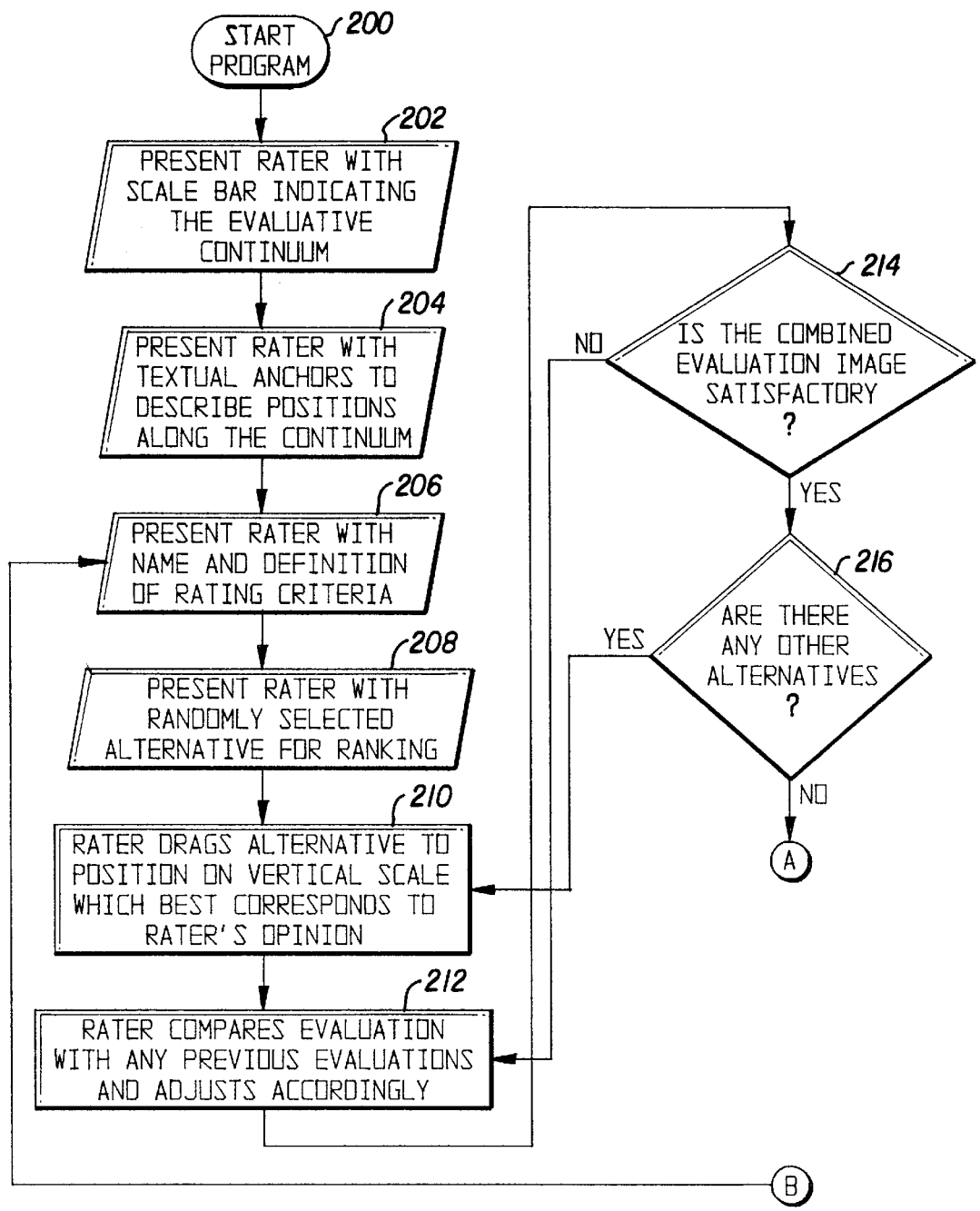
FIG. 2(A) is a diagram of a flowchart of a program used in connection with the visual rater interface of the performance appraisal system of the present invention.

Prior to describing the visual rater interface and conversion and reporting of the information gathered by that visual interface in connection with the performance appraisal system of the present invention, a brief description of the appraisal cycle used in connection with the performance appraisal system of the present invention is provided.

The performance appraisal system of the present invention solves many of the problems associated with capturing and communicating the complex decisions involved in evaluating performance. In addition, the performance appraisal system of the present invention addresses the challenges of implementing solutions across a company. The performance appraisal system of the present invention includes modules for all phases of the appraisal cycle, namely, the creation of rating factors, the creation of behavioral anchors or other scale markers, the creation of groups within which the individuals' performance is to be compared, the on-line selection of raters, supervisor and human resources review of rater selections, systems set up and maintenance and feedback reporting.

As briefly described, once the decision to implement the performance appraisal system of the present invention has been made, training is first provided for a systems administrator, for making rater selection, for evaluating appraisals and for supervisors in order to help them understand and explain the individual profiles that the rater system produces. After the training, and prior to the time the performance appraisal system of the present invention is implemented in a company by means of its computer network, human resource administrators must define and set up the way in which the training session will operate. Such set up is performed within the administrator module, which is also used during the rater session to run administrative reports, make maintenance changes to the system's database and to monitor progress of the rater session. Inasmuch as such functions are believed to be well known in the art, further discussion of them is not provided in connection with the instant performance appraisal system.

After the system has been set up, the next step is to select the raters. That function is performed using the rater selection module. The performance appraisal system of the present invention provides the option of allowing employees to select their own raters, which selections can then be reviewed by the supervisors and human resource departments, if necessary and desired.

It is believed that the rater selection module will also be well known to those of ordinary skill in the art, and therefore, no further discussion of that module is provided.

After the system is set up, the raters have been selected and have been reviewed by appropriate supervisory personnel, the appraisal then proceeds. After all of the data has been entered into the performance appraisal system of the present invention, the reporting and feedback module functions are utilized.

Once the rater teams have been selected for all participants, individuals who were selected as raters log onto the performance appraisal system by means of their computer system in order to record their appraisals. The performance appraisal system of the present invention presents the raters with a menu of employee groups that they will be evaluating. Those are the groups that were created during the system set up phase.

A menu window is provided to the raters which guides them through the rater process. Once a rater records an evaluation for each person in his group for each rater factor, that group's status is updated on the menu. Raters can then return to any group at any time in order to review and amend their responses. That feature lets users complete some of their ratings, exit the program and then return later to finish rating.

Referring now to the drawings in which like reference numerals designate like elements throughout, there is shown in FIG. 1 a sample computer screen which displays the visual rater interface 100 used in connection with the performance appraisal system of the present invention. The visual rater interface 100 is designed such that raters may contemplate each employee's performance based on individual rating criteria. The raters then place the employees 114, 116 and 118 (only three names are shown for purposes of simplicity) along the vertical scale 102 at a position that best matches the raters' assessment. Many employees' names can be placed at the same level to indicate a tie. The vertical scale bar 102 provides a quick and easy-to-understand reference for the positioning of employees. Behavioral anchors 104 are provided along the length of the vertical scale bar 102 in order to give the raters a common reference for the meaning of the positions along the vertical scale bar 102. As shown in FIG. 1, up to four names can be placed at the same level 106, which indicates that each of the employees named is tied. This feature allows flexibility while encouraging differation of the employees being rated.

The visual rater interface 100 also displays the current rating factor box 112 and a brief description of that factor. Detailed information and examples concerning the rating factors shown are available at the click of the button 120. Explanations of the categories being scored clarify exactly what the person being rated is being rated for.

Figure 5:
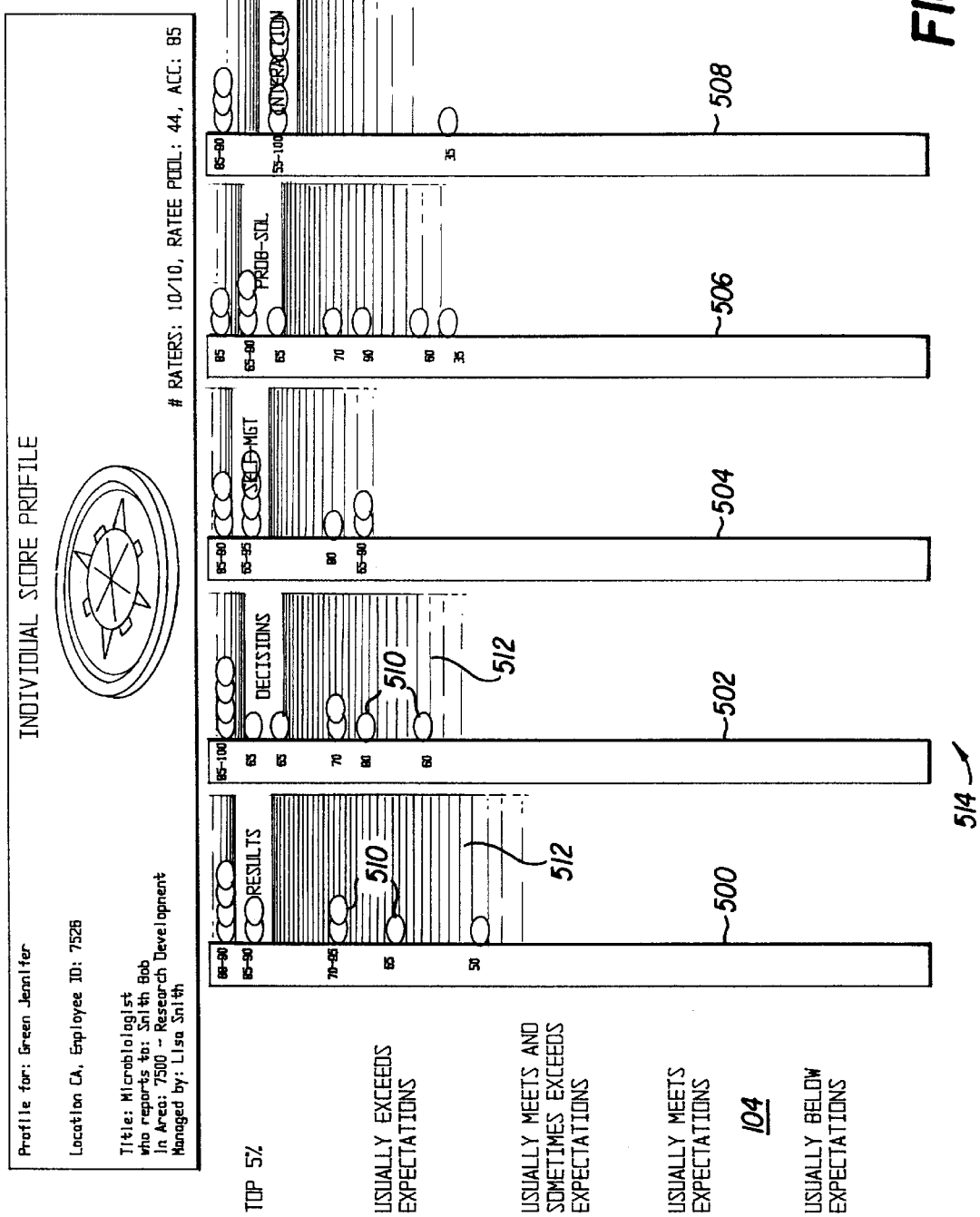
FIG. 5 is a drawing of an individual score profile report generated by the performance appraisal system of the present invention.

In addition to the decisions rating factor shown in box 112, other rating factors, such as those shown in FIGS. 5 and 6, are results, self-management, problem solving and interaction with other individuals. However, it will be readily apparent to those of ordinary skill in the art that other such rating factors may also be utilized. The use of additional rating factors is also contemplated by the performance appraisal system of the present invention.

The visual rater interface 100 also provides a box 108 which displays the ratee names selected in random order on each screen in order to avoid leading raters.

The visual rater interface 100 of the present invention is also provided with a box 108 in which raters can place the names of ratees whom they believe they do not have enough information to accurately evaluate.

Figure 2B:
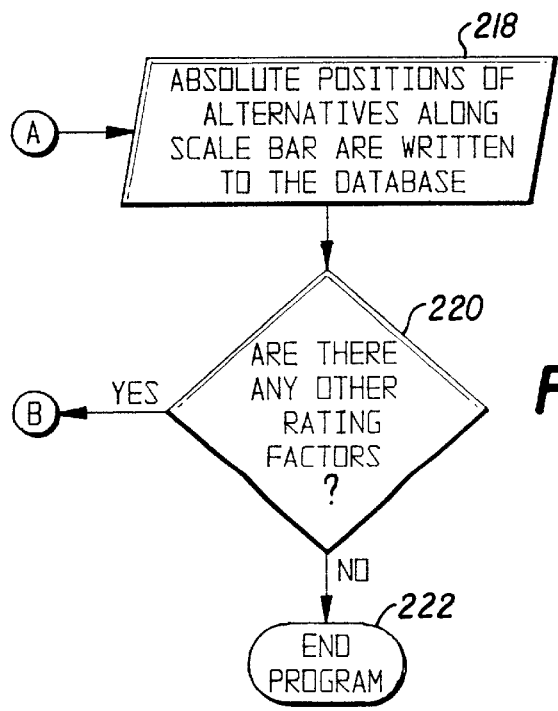
FIG. 2(B) is a diagram of the remainder of the flowchart of the computer program shown in FIG. 2(A)
Figure 3:
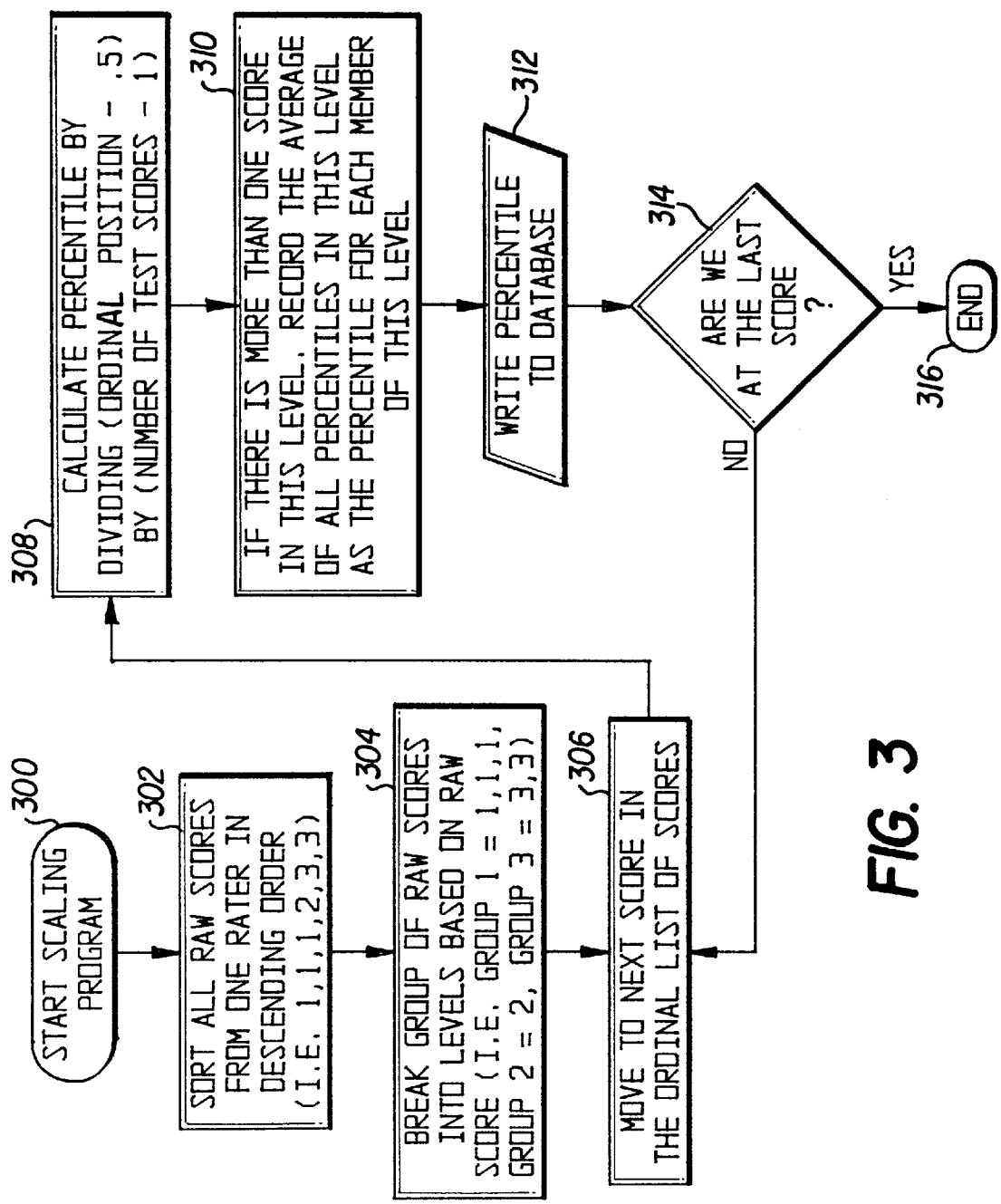
FIG. 3 is a diagram of a flowchart of a the program used for assessing the data information gathered by means of the visual rater interface of FIG. 1 used in connection with the performance appraisal system of the present invention.

FIGS. 2A–2B demonstrate, in diagrammatic flowchart form, the Visual Rater Interface Module of the software program of the present invention. That program starts at step 200 and then presents the rater with the visual scale bar 102 indicating the evaluative continuum. Next, at step 204, the rater is presented with the textual anchors 104 which describe positions along the continuum of the visual scale bar 102.

Then, at step 206, the rater is presented with the name definition of the rating criteria in the box 112. Next, at step 208, the rater is presented with a randomly selected ratee alternative for ranking in the box 108.

The rater then drags the ratee alternative from the box 108 and positions it at a location on the vertical rating scale 102 which best corresponds to the rater's position of that ratee's performance and the criterion, all at step 210. At step 212, the rater compares the evaluation of the current ratee alternative to any previous evaluations of the ratee alternatives and adjusts the ratees accordingly along the vertical scale bar 102.

A determination is then made at step 214 of whether the combined evaluation image shown on the screen is satisfactory to the rater. If it is, then a determination is made at step 216 of whether there are any other ratee alternatives.

If it is determined at step 216 that there are other ratee alternatives, then the program goes back and begins executing steps 210–214 to allow the rater to rate the next ratee for the criterion under consideration.

If, at step 214, the rater is not satisfied with the evaluation image, then the program goes back to step 212 and allows the rater to again compare the evaluation of the current ratee alternative with any previous evaluations and to make any desired adjustments.

If it is determined at step 216 that there are no other ratee alternatives, then, as shown in FIG. 2B, the absolute positions of the ratee alternatives along the vertical scale bar 102 are written to the database module of the performance appraisal system program. Then, a determination is made in step 220 of whether there are any other rating factors to be considered. If a negative determination is made at step 220, then the program ends at step 222. If, on the other hand, an affirmative determination is made at step 220, then the program jumps back to step 206 and presents the rater with the name and definition of the next rating criteria. The appraisal of the performance appraisal system software then executes steps 208–210, etc., as described above.

Once the rater has completed the appraisal for all of the alternative ratees for each of the rating criterion, the Scaling Module of the program is started at step 300. The scaling program sorts all of the raw scores from one rater in descending order at step 302. That is, the scores of each of the raters are sorted according to how many number 1 scores they gave, number 2 scores, number 3 scores, etc. Then, at step 304, the group of raw scores is broken into levels based upon their raw score. Group 'consists of all of the number 1 scored ratees, Group 2 equals all of the number 2 scored ratees. and Group 3 equals all of the number 3 scored ratees.

Then at step 306, the scaling program moves to the next score in the ordinal list of scores. Then, at step 308, the percentile for each ratee is calculated by dividing the ordinal position minus 0.5 by the number of scores minus 1. If it has been determined that there is more than one score in this level, then the average of all percentiles in this level is recorded as the percentile for each member of this level, all at step 310. At step 312, the ratee percentile is written to the database module of the performance appraisal system software. A determination is then made at step 314 of whether the last score to be processed has been processed. If it has, then the program jumps to step 306 and continues executing with that step. If an affirmative determination is made of step 314, then the Scaling Module ends at step 316.

Once all of the evaluations have been obtained by the instant performance appraisal system and the scaling program has completed scaling the evaluation scores, the performance appraisal system of the present invention produces composite reports for each participant. Such reports are designed to show ratees how well they met the needs of their customers overall and to demonstrate the specific areas in which they have strength and weaknesses.

The performance appraisal system of the present invention provides credible and consistent reports. The screen that the employees see as raters has the same look and scale as their printed performance profiles. Such a closed-loop visual design removes the confusion inherent in many performance appraisal processes, which gather information in one manner and present it in another.

Figure 4:
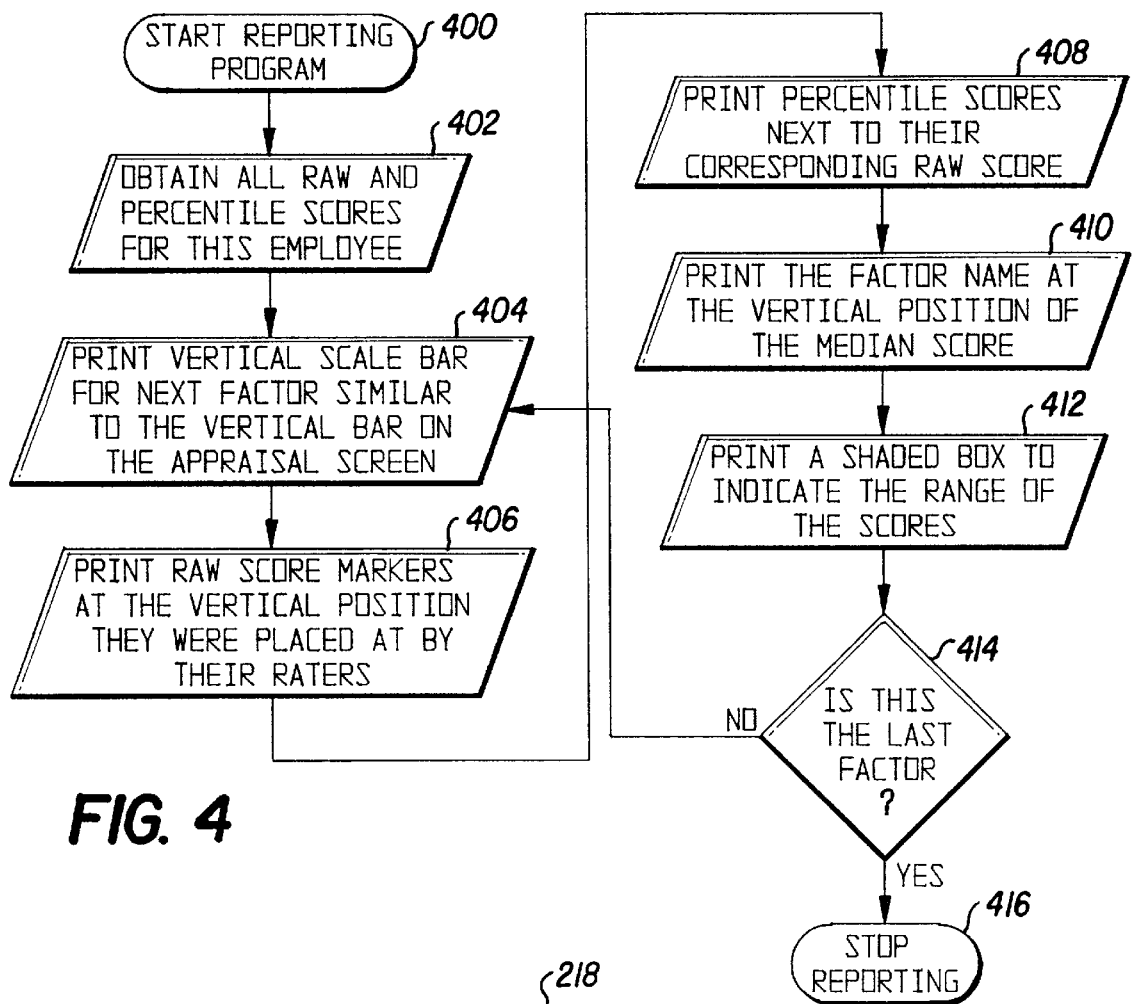
FIG. 4 is a diagram of the flowchart of a program used to prepare reports in connection with the performance appraisal system of the present invention.

Referring now to FIG. 4, there is shown in diagrammatic flowchart form, the Reporting Module of the performance appraisal system software. The reporting program starts at step 400 and then obtains at step 402, all of the raw and percentile scores for the employee who is subject of the report being prepared. At step 404, the vertical scale bar is printed for the next rating factor. The vertical scale bars 500–508, as shown in FIG. 5, are printed in a manner similar to the vertical scale bar 102 presented to each rater on the appraisal screen 100 in FIG. 1.

Then, at step 406, the raw score markers 510 for each of the vertical scale bars 500–508 for each of the rating criteria are printed at the vertical position where they were placed by their raters.

Next, at step 408, the percentile scores are printed on each respective vertical scale bar 500–508 next to the corresponding raw score. The factor name corresponding to each of the vertical scale bars 500–508 is printed at the vertical position of the median score for that rating factor. Thus, as shown in FIG. 5, each of the rating factors, in this example: namely results, decisions, self-management, problem solving and interaction, is printed at the percentile score which indicates the median score for all ratees being rated.

At step 412, the shaded box 512 is printed next to each of the vertical scale bars 500–508, which indicates the range of scores obtained for each of the ratees being rated for that particular rating criteria.

Next, at step 414, a determination is made of whether the current rating factor being assessed and presented on the report is the last of the rating factors. If a negative determination is made in step 414, then the reporting program jumps to step 404 and begins processing the next rating factor, as previously described. If an affirmative determination is made at step 414, then the reporting program stops reporting at step 416.

As previously described, FIG. 5 illustrates an individual score profile for a theoretical individual. The same behavioral anchors 104 which are used on the visual rater interface 100 are repeated in the individual score profile report in FIG. 5. Each marker 510 shown on the report 514 shows one score from one rater, exactly in the position in which the rater placed it.

As previously described, the rating factor's name is printed at the median score obtained by the individual for that factor. The number of raters who provided ratings is shown at the top of the individual's score profile report 514 as well as the number of ratees rated during that test cycle. In addition, an "Acc" factor is given which shows the percentile score statistical reliability of the ratee, in a theoretical range from near zero to 95, in which a higher score is more reliable.

FIG. 6 illustrates a departmental spread sheet for each of the employees rated in the department. It shows the median scores for each employee as well as the median percentiles for each of the employees in the department.

The improved performance appraisal system generates individual profile reports such as the individual score profile report 514 shown in FIG. 5, such that it effectively communicates the individual and median scores attained by each employee during the rating process. It thus gives employees a detailed view of rater responses as well as an unbiased view of their strengths and weaknesses.

It should be obvious to those of ordinary skill in the art that the instant performance appraisal system provides a more sophisticated analysis of rater behavior than prior systems. For example, both supervisors and participants can take a much more data oriented look at their rater group, learn which raters, if any were too lenient or too harsh, and emphasize other responses accordingly. It also should be obvious to those of ordinary skill in the art that other reports which include such options as sophisticated data analysis, new or reformatted visual presentation, special data representation and sorting and distribution can also be generated by the performance appraisal system of the present invention.

The performance appraisal system software of the present invention can operate on most personal computers 700 such as those running Windows 3.1, 3.11, Windows NT 3.51 or Windows 95. It requires approximately 200 Kb of disk storage space for each client or employee, which can be located in either the client's local personal computer or on the company's network 704. The performance appraisal software also requires an additional 5 Mb in system files storage space located on the hard drive of the shared network directory. The database portion of the software requires storage of approximately 4 megabytes per 1000 users. Obviously, such personal computer includes a monitor with computer screen 702.

The performance appraisal system of the present invention can be used in both LAN and client-server versions of networks. It also may be used in a stand-alone mode for raters who do not have access to the company's internal network. Such a mode is useful for collecting feedback from off-site raters, travelling sales representatives and clients. In addition, the performance appraisal system software of the present invention has the built-in capability to import data from all leading database programs, which reduces the high cost and chance of introducing new errors which are widely associated with redundant data entry. It can also interface with various human resource programs as PeopleSoft, available from PeopleSoft of Walnut Creek, Calif. 94596 and HR-1, available from Ceridian of Atlanta, Ga. 30328. In addition, paperwork can be reduced by generating automated feedback responses through a company's E-mail system.

The present invention is also directly applicable to a broad range of uses where a need exists to compare the merit of several alternatives, on the basis of criteria created by the user, through the invention's system administrator module. The example used throughout, of an employer's need to evaluate and compare individual employees' work performance, does not limit the invention's applicability to that use. Any situation where candor might be inhibited by the information gathering method and/or an intuitive, non-verbal, non-numeric comparative method is advantageous—and suitable computers are available to gather information from the raters—would be an ideal use for the system of the present invention.

Although only a preferred embodiment is specifically illustrated and described herein, it will be appreciated that many other modifications and variations of the present invention are possible in light of the above teachings and within the purview of the appended claims without departing from the spirit and intended scope of the invention.

What is claimed is:

1. A visual rater system, comprising:
    at least one rating criterion;
    a vertical scoring bar having non-numeric scoring criterion representative of said at least one rating criterion along its length; and
    at least two objects which may be movably placed along the length of said vertical scoring bar so as to indicate a relationship between said at least two objects relative to said at least one rating criterion.

2. The visual rater system of claim 1, wherein said system is displayed on a computer screen.

3. A method for a visual rater system, comprising the steps of:
    displaying for a rater an image having a vertical scoring bar for at least one rating criterion, said vertical scoring bar having non-numeric scoring criterion representative of said at least one rating criterion along its length;
    providing at least two objects which may be moved and placed along the length of said vertical scoring bar so as to indicate a relationship between said at least two objects relative to said at least one rating criterion; and
    generating reports displaying the relationship between said at least two objects for said at least one rating criterion using information obtained during said displaying and providing steps.

4. The method of claim 3, further including the step of determining a numerical score for each object for each rater for each criteria based upon placement of each object on each rater's vertical scoring bar.

5. The method of claim 3, wherein said step of generating reports includes the step of producing a visual report which presents the results of a completed rating process by presenting an image analogous to said image displayed for a rater.

6. The method of claim 4, further including the step of determining a rank of each score given to an object by a rater for all of that rater's scores.

7. The method of claim 3, further including the step of characterizing ratings of objects as likely harsh or likely lenient.

8. The method of claim 4, further including the steps of measuring and reporting a statistical accuracy of information displayed in the reports.

9. A visual rater interface system for display on a computer screen, comprising:
    a plurality of benchmark criteria shown on said computer screen one at a time;
    a screen image for enabling raters to compare a set of alternatives to each other and to one of said plurality of benchmark criteria in turn, said screen image also providing for simultaneous reporting of rank and scale for each of said set of alternatives; and
    a plurality of visual symbols which may be electronically positionable adjacent to said screen image in order to input a rating for each alternative in each of said sets of alternatives.

10. The system of claim 9, further including determining a numerical score for each alternative for each rater for each criterion based on each alternative's visual symbol's position on each rater's visual rater interface.

11. The system of claim 9, further including a visual report which presents the results of a completed rating process by presenting an image analogous to said screen image originally used to compare said alternatives using said visual rater interface.

12. A method for presenting and using a visual rater interface system for display on a computer screen, comprising the steps of:
    displaying a plurality of benchmark criteria on said computer screen;
    providing a screen image for enabling raters to compare a set of alternatives to each other and to one of said plurality of benchmark criteria in turn, said screen image also providing for simultaneous reporting of rank and scale for each of said set of alternatives; and
    displaying a plurality of movable visual symbols on said computer screen for use in inputting a rating for each alternative in each of said sets of alternatives.

13. The method of claim 12, further including the step of determining a numerical score for each alternative for each rater for each benchmark criterion based upon a position of each alternative's visual symbol on each rater's visual rater interface.

14. The method of claim 12, wherein said screen image comprises a vertical scale bar having a length along which said visual symbols may be placed.

15. The method of claim 12, further including the step of producing a visual report which presents the results of a completed rating process by presenting an image analogous to said screen image originally used to compare said alternatives using said visual rater interface.

16. The method of claim 13, further including the step of determining a rank of each score given to an alternative by a rater for all of that rater's scores.

17. The method of claim 12, further including the step of characterizing ratings of alternatives as likely harsh or likely lenient.

18. The method of claim 1, wherein said screen image comprises a vertical scoring bar for each rater the vertical scoring bar having a length along which said visual symbols may be placed, and further including the step of determining a numerical score for each visual symbol for each rater for each criterion based upon placement of each visual symbol on each rater's vertical scoring bar.

19. A visual rating system for allowing each of a plurality of raters to evaluate a plurality of ratees on a plurality of criteria, the system comprising:

a display;

means for displaying a plurality of movable objects on the display;

means for receiving an input from each of the plurality of raters to allow each of the plurality of raters to move at least two of the objects to relative positions that represent the rater's evaluation of the ratees on the plurality of criteria such that the rater does not need to report the evaluation in words or numbers;

means for generating both ranked and scaled evaluations of the ratees on the plurality of criteria in accordance with movements of the objects by the raters; and means for reporting the ranked and scaled evaluations.

20. The system of claim 19, wherein the means for generating generates (i) the ranked evaluations in accordance with a rank order of the relative positions to which the objects are moved and (ii) the scaled evaluations in accordance with at least one distance separating the relative positions to which the objects are moved.

21. A visual rating method for allowing each of a plurality of raters to evaluate a plurality of ratees on a plurality of criteria, the method comprising:

providing a display;

displaying a plurality of movable objects on the display;

receiving an input from each of the raters to allow each of the raters to move at least two of the objects to relative positions that represent the rater's evaluation of the ratees on the plurality of criteria such that the rater does not need to report the evaluation in words or numbers;

generating both ranked and scaled evaluations of the ratees on the plurality of criteria in accordance with movements of the objects by the raters; and reporting the ranked and scaled evaluations.

22. The method of claim 21, wherein the step of generating comprises generating (i) the ranked evaluations in accordance with a rank order of the relative positions to which the objects are moved and (ii) the scaled evaluations in accordance with at least one distance separating the relative positions to which the objects are moved.

* * * * *